June 13, 1939. E. H. KOCHER 2,161,821
LUBRICATION
Filed Jan. 16, 1935 9 Sheets-Sheet 1
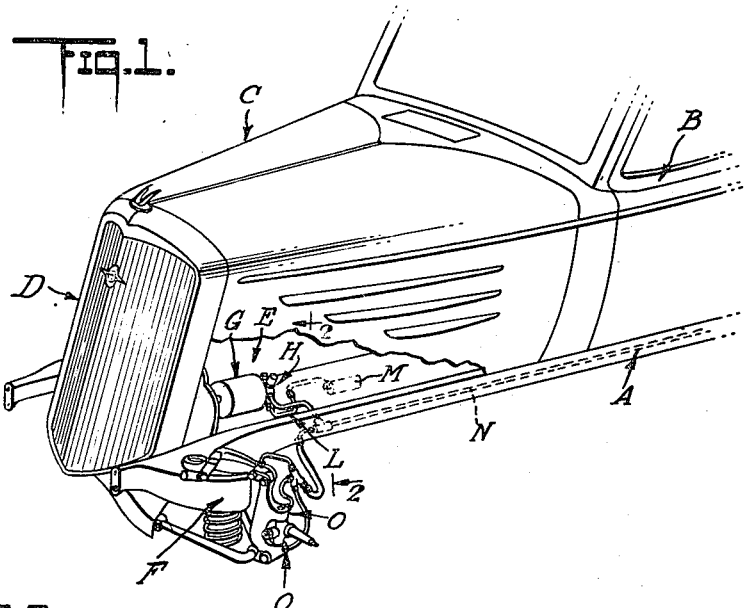
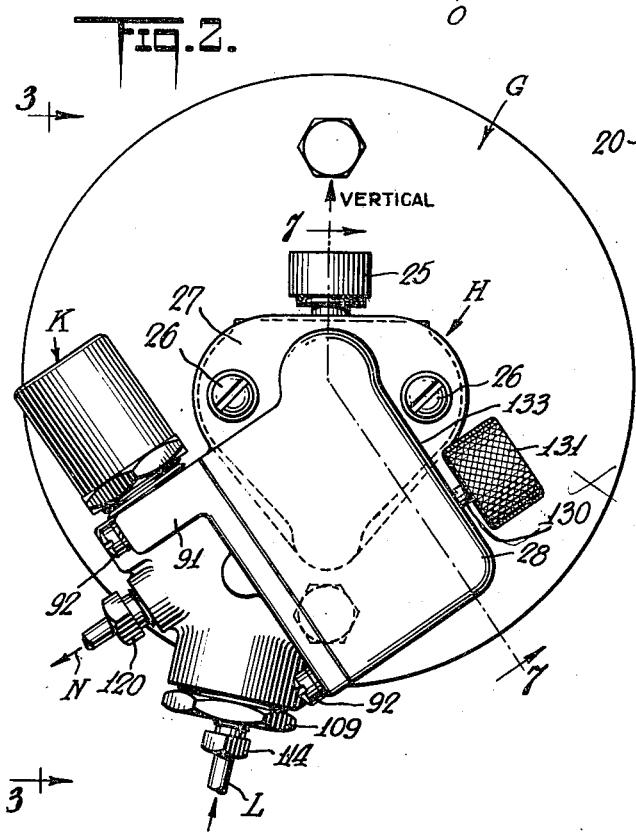
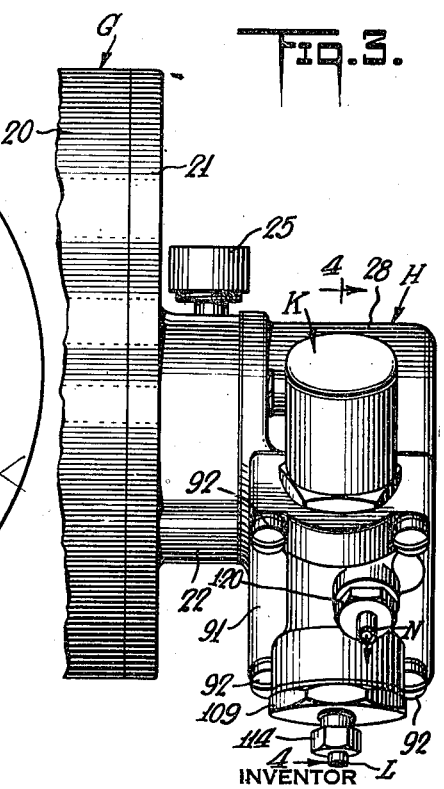
INVENTOR
*Edward H. Kocher*
BY
*Leen Fairbank Hirsch & Foster*
ATTORNEYS

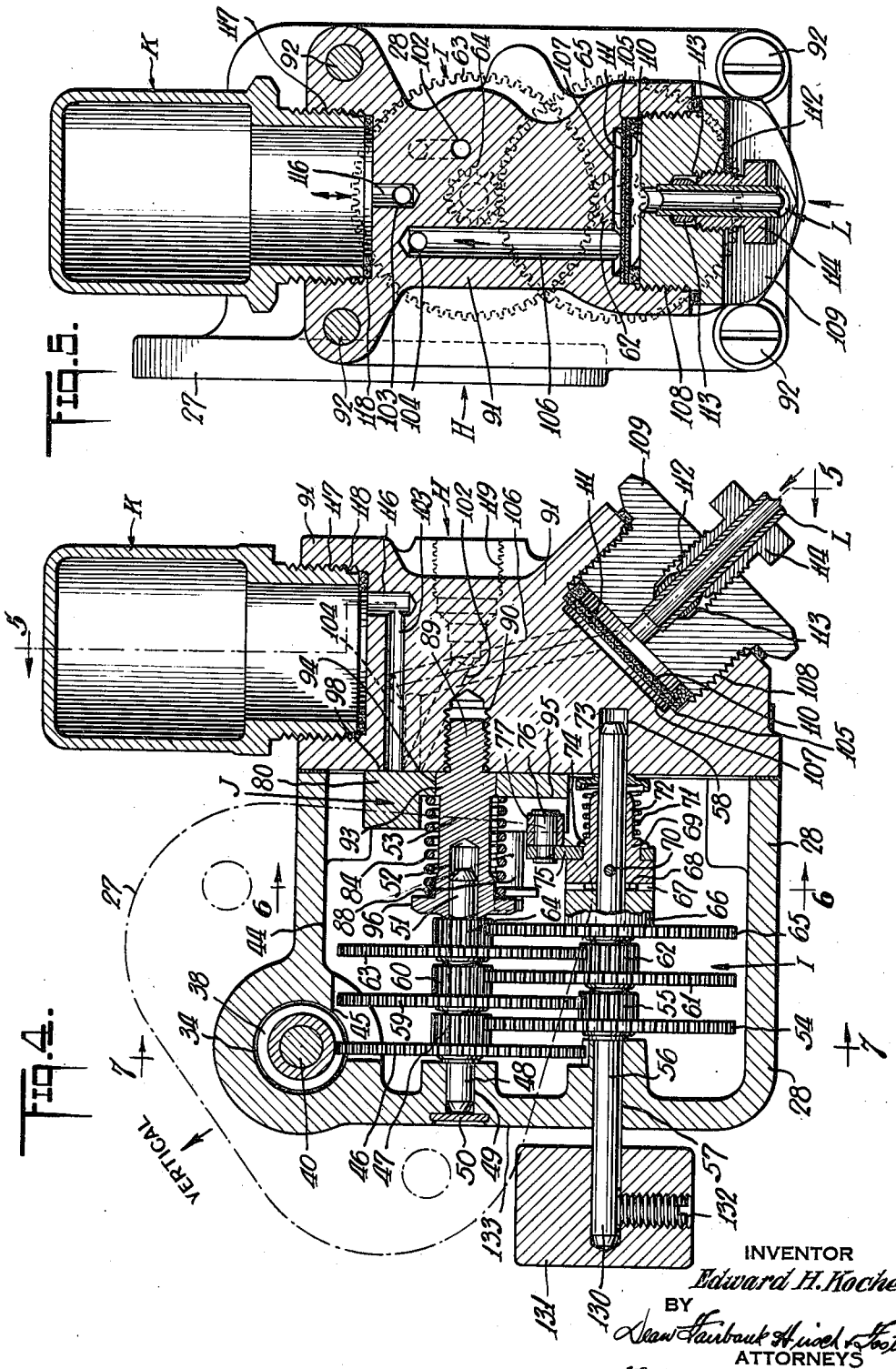

June 13, 1939.  E. H. KOCHER  2,161,821
LUBRICATION
Filed Jan. 16, 1935   9 Sheets-Sheet 3
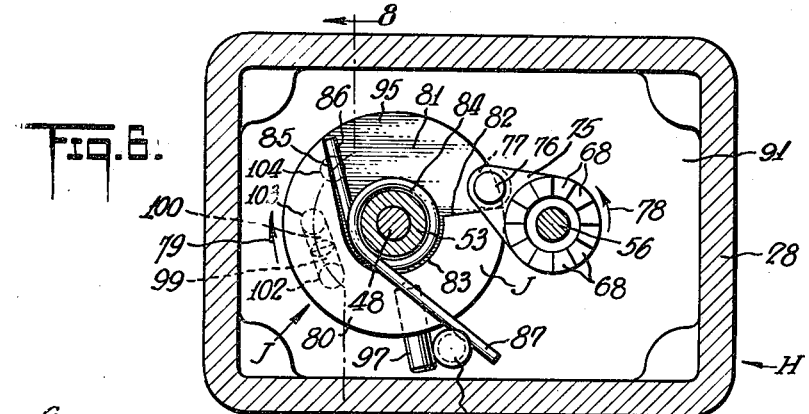
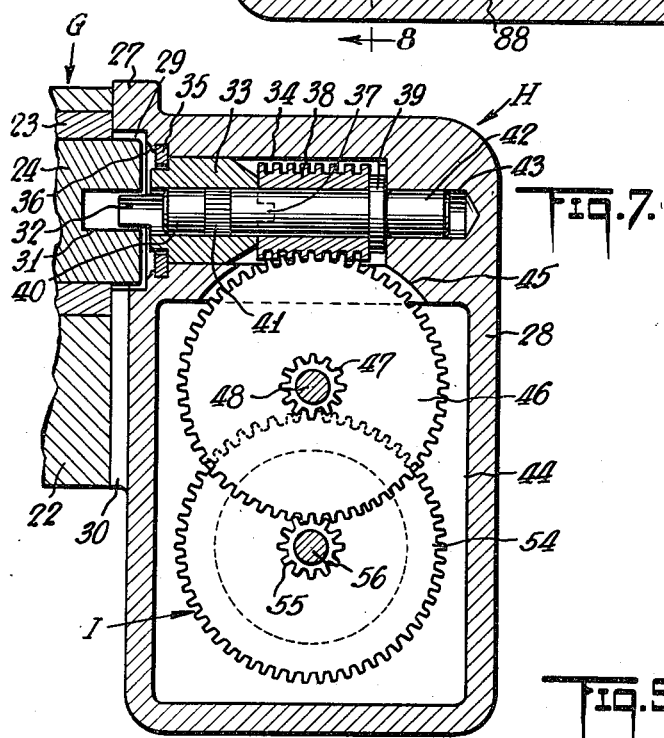
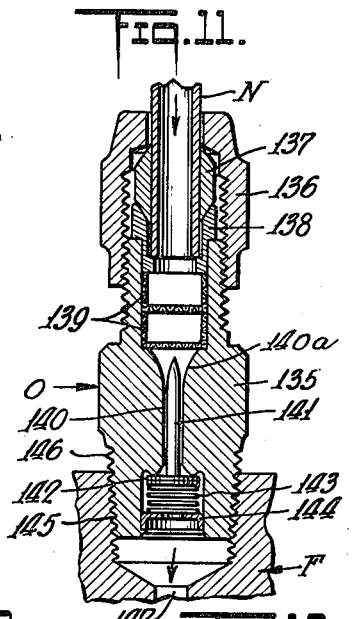
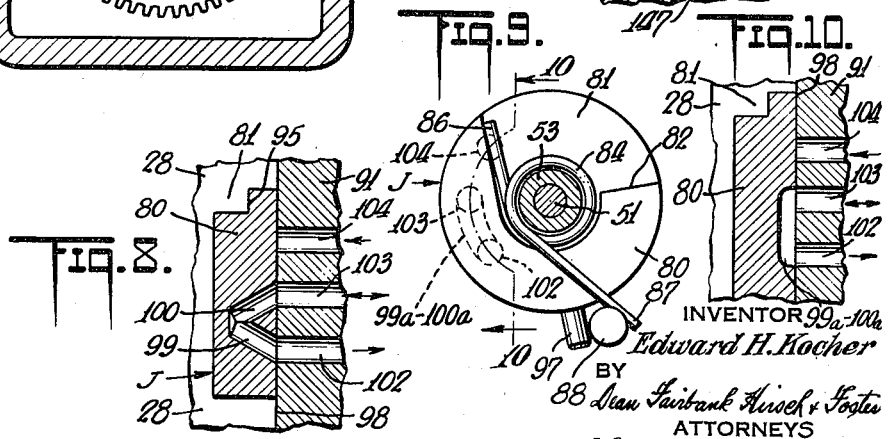
INVENTOR
Edward H. Kocher
BY Dean Fairbank Hirsch & Foster
ATTORNEYS June 13, 1939.  E. H. KOCHER  2,161,821
LUBRICATION
Filed Jan. 16, 1935    9 Sheets-Sheet 4
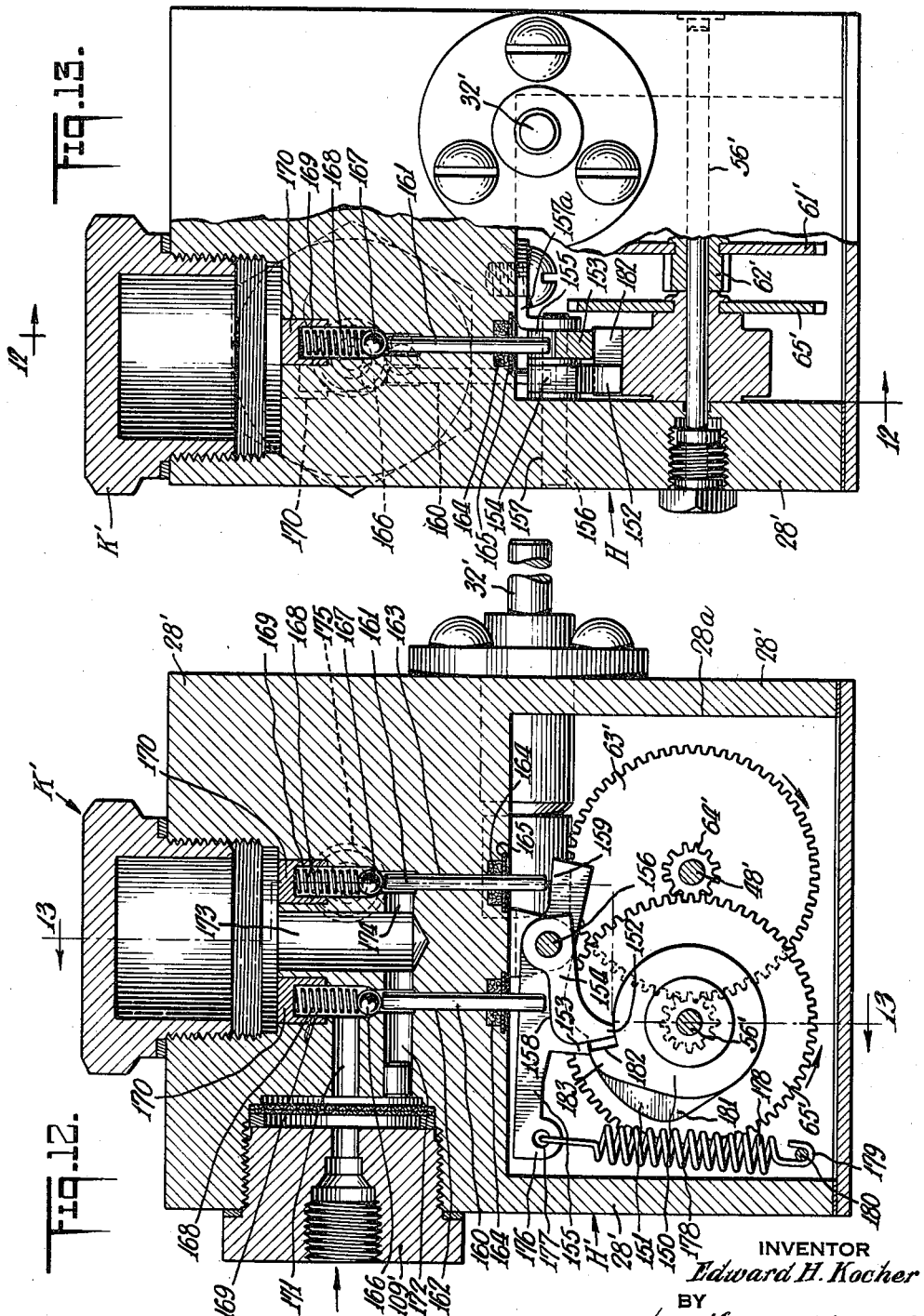
INVENTOR
Edward H. Kocher
BY
ATTORNEYS

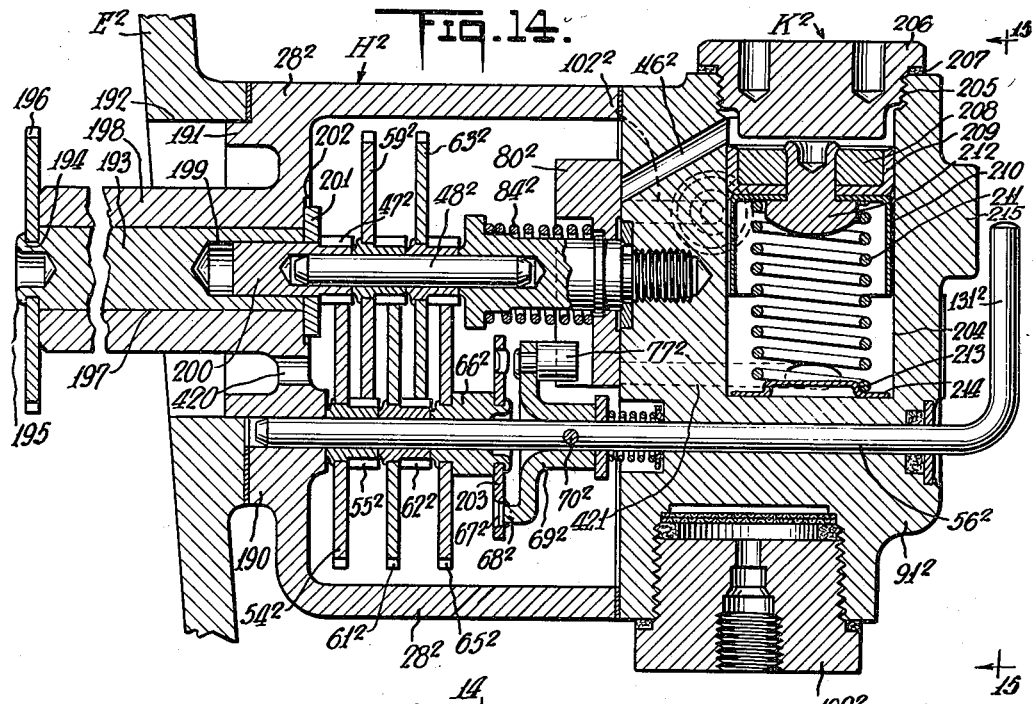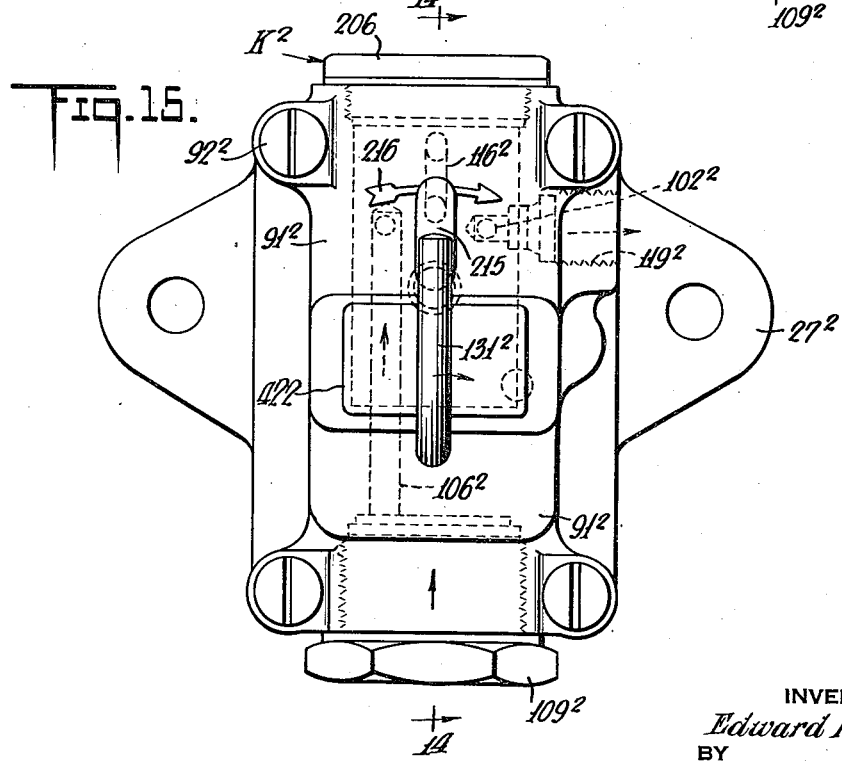

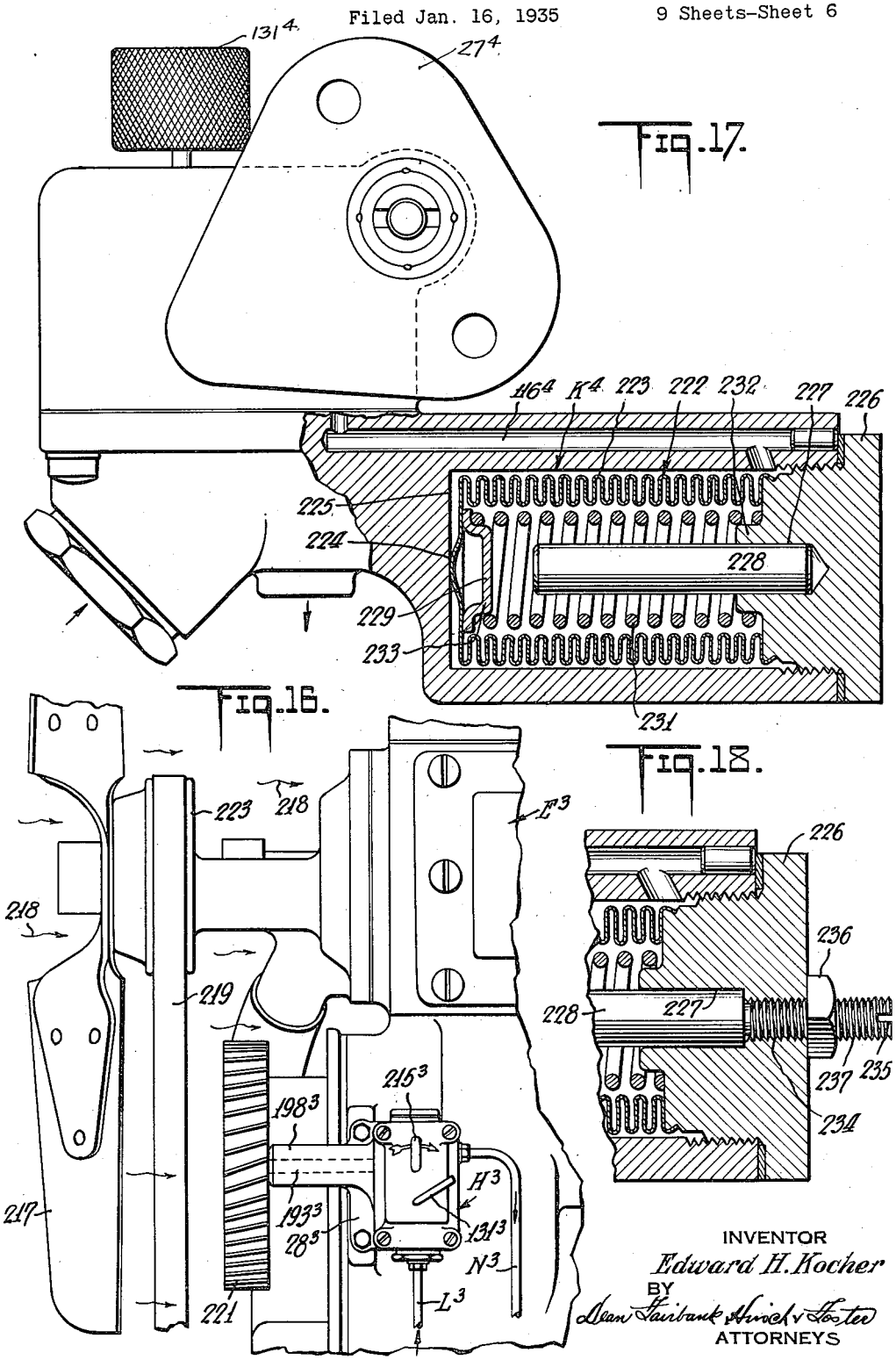

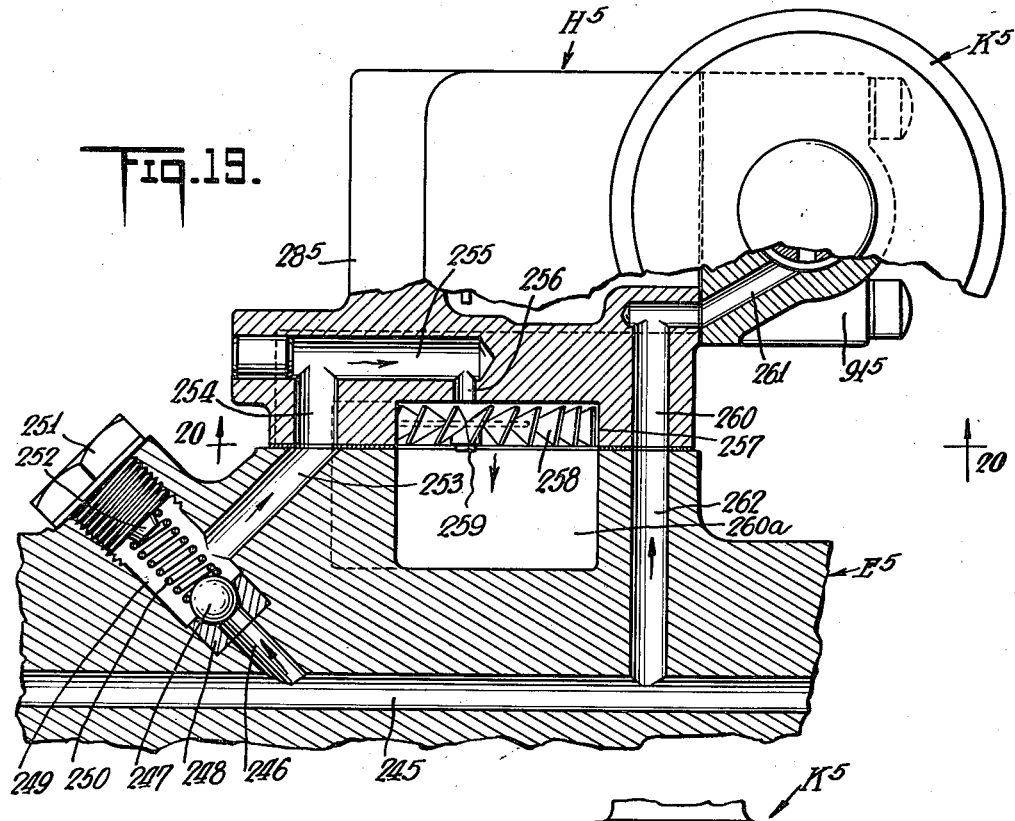
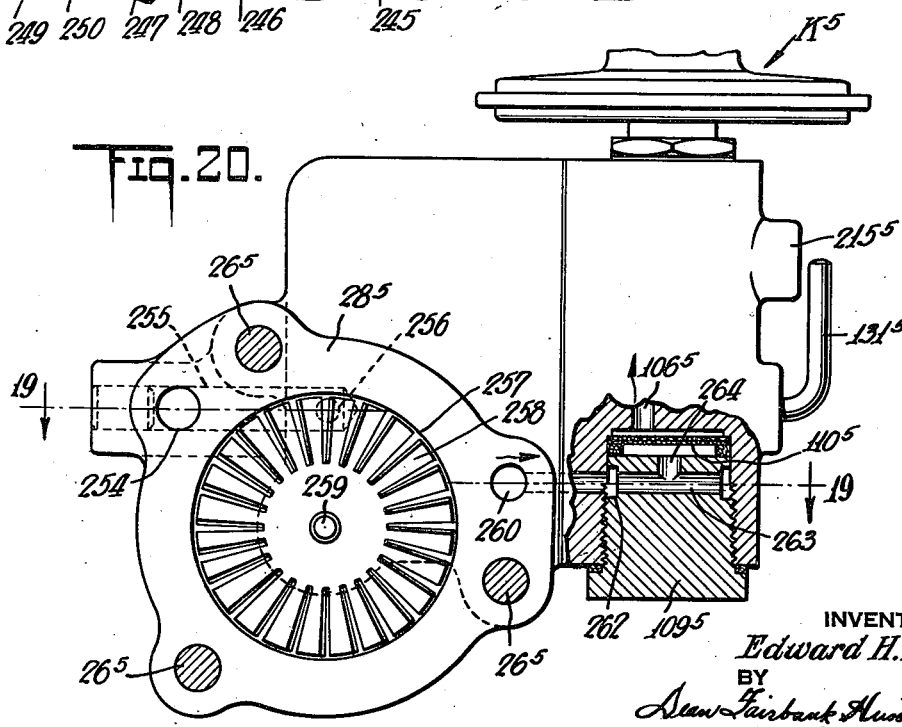

June 13, 1939. E. H. KOCHER 2,161,821
LUBRICATION
Filed Jan. 16, 1935 9 Sheets-Sheet 8

INVENTOR
Edward H. Kocher
BY
Dean Fairbank Hirsch & Foster
ATTORNEYS

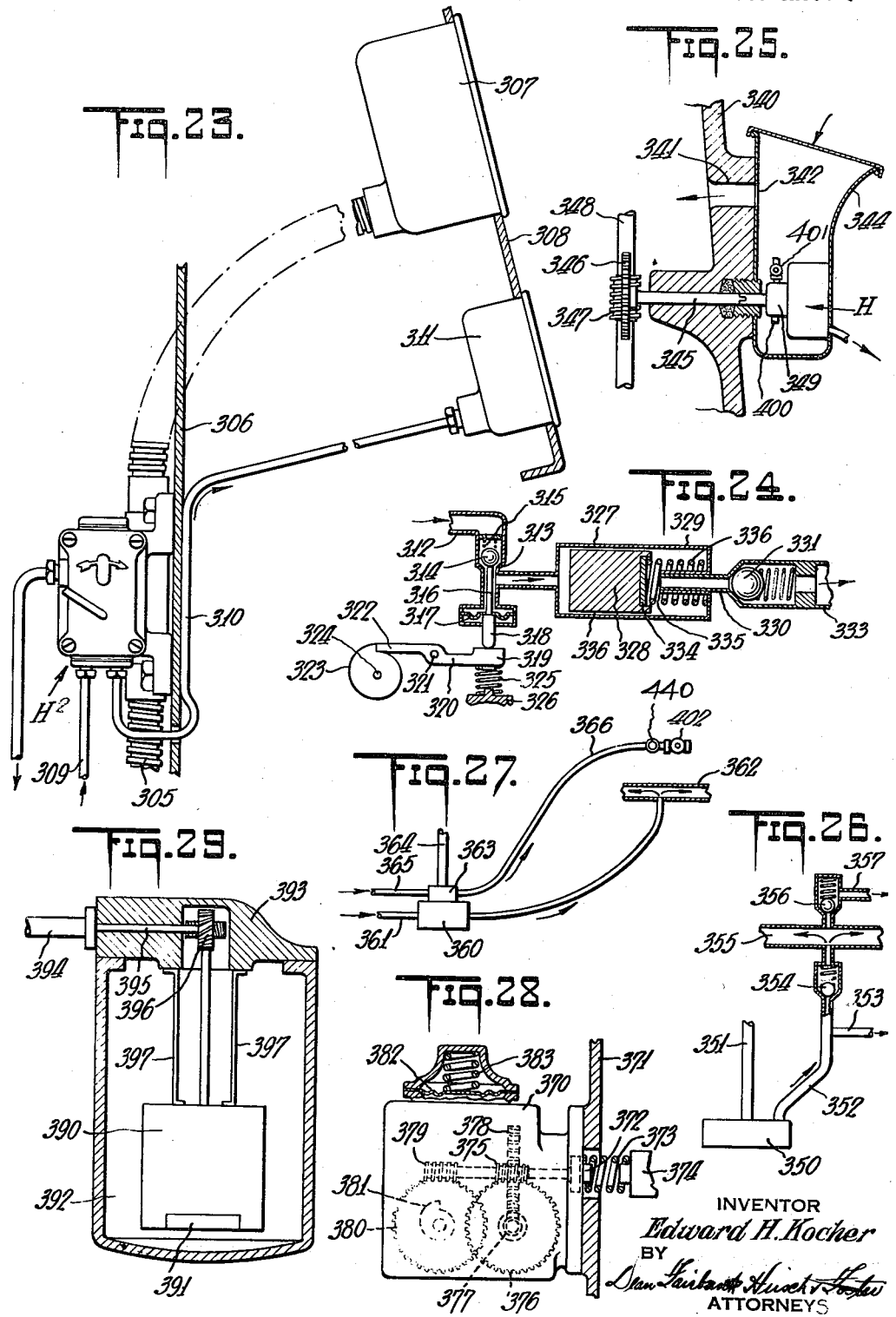

Patented June 13, 1939

2,161,821

UNITED STATES PATENT OFFICE 2,161,821

LUBRICATION

Edward H. Kocher, Boonton, N. J., assignor to Auto Research Corporation, a corporation of Delaware Application January 16, 1935, Serial No. 1,985

19 Claims. (Cl. 184—7)

The present invention relates to centralized lubricating systems, particularly for automobile chassis.

Among the objects of the invention is to provide a completely automatic chassis lubricating system requiring no attention on the part of the driver, either as to supplying it with lubricant or operating it, making use of sources of power and lubricant supply already available for lubrication of the engine, and assuring an adequate predetermined supply of lubricant regardless of the weather and driving conditions.

Another object is to provide a system of the above type in which the lubrication of the engine is in no way disturbed or impaired and the distribution of lubricant to the chassis bearings is assured during even a relatively short run of the vehicle, while lubrication is substantially precluded when the vehicle is out of operation.

Another object is to provide a system of the above type in which the engine oil can be utilized to advantage for chassis lubrication, without the necessity for any special cleansing or treatment thereof and yet without the likelihood of clogging passages in the chassis line or impairing proper distribution thereof to the chassis bearings.

Another object is to provide a system of the above type which affords an inherent safeguard against the possibility of drainage or removal of an excessive amount of lubricant from the engine oil system, even should the chassis line develop a leak or other defect.

Another object is to provide an installation of the above type which necessitates no substantial modification of drip plug distributing systems of the approved type, such as covered in prior Patents No. 1,632,771 and No. 1,732,212.

Another object is to provide an installation of the above type which dispenses with the need for auxiliary tanks, pumps, or controls, and involves merely the interposition of a simple, compact, and inexpensive unit between the engine oiling system and the chassis distributing system, which unit may be disposed in any of a wide variety of locations.

Other objects will appear during the course of the following specification.

In accomplishing these objects it has been found most satisfactory to provide an oil segregating unit which will receive its supply of oil and propulsive energy from the engine oil pump and will then propel the oil to the bearings by way of a drip plug distribution system at such spaced intervals as to assure that the bearings will receive their proper supply of lubricant whenever the automobile is running.

A feature of the invention is the periodic charging of the receiving chamber of the segregating unit from the engine oil pump and the normal open connection of the receiving chamber to the drip plug distributing system throughout the much longer intervals between successive charging operations.

The oil segregating unit preferably includes an air bell or other resilient chamber, and such chamber is preferably of volume sufficiently large to assure the maintenance during its discharge into the chassis distributing line of a sustained pressure throughout said line, and sufficiently small to assure discharge into the chassis lines at relatively frequent intervals, with the avoidance of flooding or over-oiling the bearings, as might occur with excessively large shots.

In a preferred embodiment an automatically driven valve serves to control the connection of the segregating unit alternately with respect to the engine oil pump and the chassis oil distributing system. Preferably, the valve element of the unit is driven from the engine, ordinarily by one of the accessories thereof, such as the generator. By disposing the segregating unit, as is preferred, within the engine enclosure, it will maintain relatively constant temperature, to assure quick charging with lubricant regardless of external atmospheric temperatures when opened to the engine oil pump.

Assurance is therefore had that regardless of the varying atmospheric temperature a substantially constant quantity of engine oil will be fed to the chassis bearings per mileage run and the actuation of the device is so regulated that when the receiver has been filled by engine pressure it will be open to the lines for a sufficient time to permit of its complete discharge, whether it quickly discharges when the oil is very fluid in summer or slowly discharges when the oil becomes viscous in winter, both discharges being at a predetermined pressure derived from the relatively constant pressure of the engine oil pump.

In the drawings, which illustrate one preferred embodiment of the present invention, Fig. 1 is a perspective view of the front of an automotive vehicle illustrating the location and position of the connection of the engine oil pump to the distributing system and also diagrammatically illustrating a part of said distributing system;

Fig. 2 is a rear view of the valving construction adapted to control the connection of the valving and receiver construction upon the line 2—2 of Fig. 1;

Fig. 3 is a side view of the receiver and valving construction upon the line 3—3 of Fig. 2;

Fig. 4 is a side sectional view of the distributing receiver and valving construction upon the line 4—4 of Fig. 3;

Fig. 5 is a side sectional view of the receiver and valving construction upon the line 5—5 of Fig. 4;

Fig. 6 is a transverse sectional view upon the line 6—6 of Fig. 4, illustrating the valving construction and its manner of actuation;

Fig. 7 is a sectional view upon the line 7—7 of Fig. 2 illustrating the connection of the valving mechanism to the shaft of the generator;

Fig. 8 is a fragmentary sectional view of the valving construction upon an enlarged scale;

Figs. 9 and 10 illustrate an alternative valving construction, Fig. 9 being a fragmentary top view, and Fig. 10 being a side sectional view upon the line 10—10 of Fig. 9;

Fig. 11 illustrates a typical flow metering device in longitudinal section which may be utilized to proportion the lubricant fed to each of the bearings;

Figure 22:
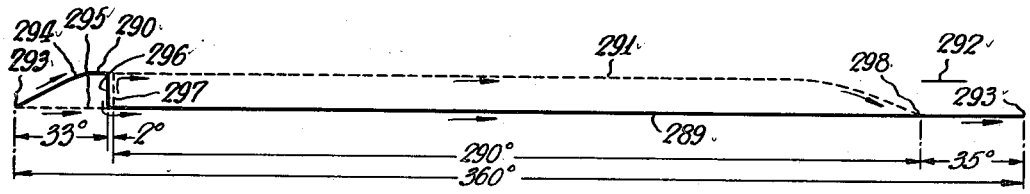
Figure 21:
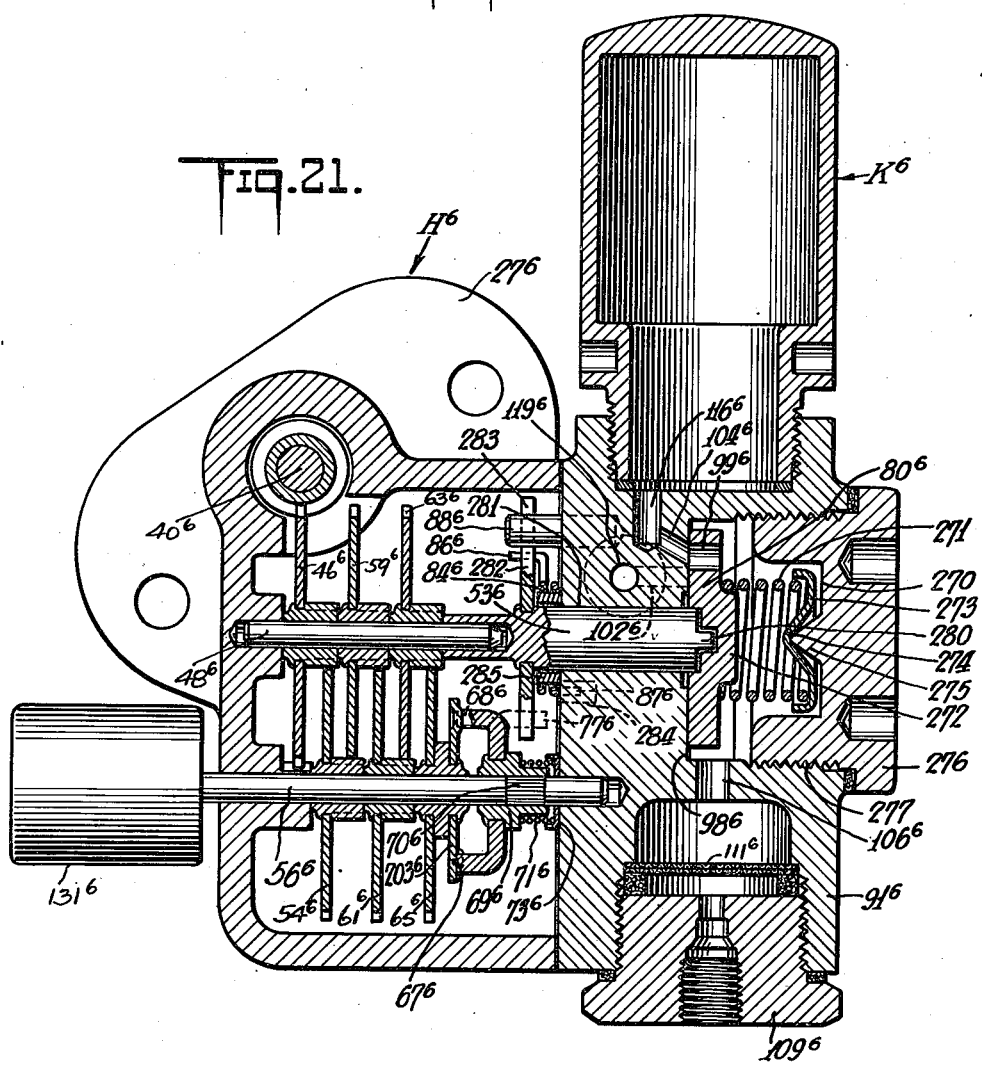

Figs. 12 and 13 illustrate an alternative receiver and valving construction, Fig. 12 being a side sectional view upon the line 12—12 of Fig. 13, offset to pass through both the inlet and outlet valve structures and Fig. 13 being a fragmentary side sectional view upon the line 13—13 of Fig. 12;

Figs. 14 and 15 illustrate an alternative receiver and valving construction, Fig. 14 being a side sectional view upon the line 14—14 of Fig. 15, and Fig. 15 being a rear elevational view upon the line 15—15 of Fig. 14;

Fig. 16 illustrates an alternative arrangement for operating the receiver and valving device of Figs. 14 and 15;

Figs. 17 and 18 each illustrate alternative receiver constructions in longitudinal section;

Figs. 19 and 20 illustrate an alternative driving arrangement and receiver device, Fig. 19 being a fragmentary side sectional view upon the line 19—19 of Fig. 20, and Fig. 20 being an elevational view in partial section upon the line 20—20 of Fig. 19;

Fig. 21 illustrates still another embodiment in side sectional view;

Fig. 22 is a chart illustrating the operation of the valving device;

Fig. 23 illustrates a valving and receiver device actuated from the speedometer shaft in side view;

Fig. 24 diagrammatically illustrates an alternative metering and receiver construction and drive therefor;

Fig. 25 diagrammatically illustrates in side sectional view an arrangement providing an independent supply of oil to the receiver and valving device;

Fig. 26 diagrammatically illustrates an arrangement for the engine oil pump to provide a differential pressure for the receiver and valving device;

Fig. 27 diagrammatically illustrates a system including the provision of an additional pump for feeding the receiver and valving device;

Fig. 28 is a fragmentary side sectional view illustrating an alternative arrangement for driving the gearing and valving arrangement, and Fig. 29 illustrates how the device may be constructed so as to be applicable to industrial machinery.

Referring to Fig. 1, the automotive vehicle is provided with the chassis A, the body B, the hood C and the radiator D enclosing the engine structure E. The chassis A is shown supported at its front end by the independent wheel suspension F diagrammatically indicated, which are adapted to carry the knuckles, wheels, brakes, and parts of the steering mechanisms.

Referring to the embodiment of Figs. 1 and 2 the shaft of generator G drives the valving and distributing receiver construction H to which construction the present invention is specifically directed.

The device H is provided with a train of gears I (see Figs. 4, 5 and 7), which drive a valve J (see Figs. 4, 6, 8 and 9) which periodically connects the engine oil pump M to the air bell K through the line L (see Fig. 1). When the air bell K has been charged from the line L, the valve returns to its initial position in which it permits the air bell K to discharge into the distributing piping N (see Fig. 1) having the proportioning outlets O, a typical one being shown in Fig. 11, leading to the various bearings of the chassis, such as those of the independent wheel suspension, and so forth.

Referring specifically to Figs. 2, 3 and 7, the body 20 of the generator G, is provided with an end plate 21, which carries the tubular boss 22 provided with a bearing bushing 23 (see Fig. 7), for the end of the generator shaft 24. The generator shaft may be lubricated by suitable oil cup or from a central system, the former being diagrammatically illustrated in Figs. 2 and 3 at 25.

Bolted at 26 to the boss 22 is the plate 27 of the body 28 of the valve unit H (see Fig. 2). The end of the generator shaft 24 (see Fig. 7) projects into the pocket 29 in the flange 27, which pocket is provided with the drainage groove 30 to remove excess quantity of lubricant from the end of the generator shaft bearing 23.

As best shown in Fig. 7 the end of the generator is provided with a slot 31 into which slot fits the key 32 on the annular shaft element 33. The element 33 bears within the cylindrical recess 34 and is held in position by the brass annulus 35, which is fixed into position at 36. The shaft element 33 is keyed at 37 to the worm 38. The worm 38 at its other end abuts against the collar 39. The annular shaft member 33 and the worm 38 fit upon the shaft 40 which is provided with a knurled portion 41 to enable fixed connection with the annular member 33. The shaft 40 is provided with a bearing extension 42 fitting in the socket 43 in the body of the housing 28 and may also be extended into an axial socket in the shaft 24 beyond the slot 31.

As shown in Figs. 4 and 7, the housing 28 is provided with a substantially rectangular chamber 44, the upper portion of which is recessed, as indicated at 45 to permit the first gear 46 of the train I to mesh with the worm 38. The gear 46 is rigidly connected to the pinion 47, and the gear-pinion unit 46—47 rides on the floating shaft 48. The shaft 48 bears within the recess 49 closed by the plate 50 and at its other end 51 bears in the recess 52 in the valve pivot member 53.

The pinion 47 (see Figs. 4 and 7) meshes with the gear wheel 54 which is similarly provided with the connected pinion 55, the unit 54—55 being interchangeable with the unit 46—47. The gear pinion unit 54—55 rotates on the floating shaft 56 which bears in a bore 57 at one side of the housing and in a recess 58 at the other side of the housing.

In these units 46—47 and 54—55, the wheels 46 and 54 are preferably formed of sheet metal stampings, while the pinions 47 and 55 are preferably cut from rods or tubing which has been suitably ridged to form the teeth. The stampings 46 and 54 when formed are preferably provided with central openings (not shown) in which the pinions 47 and 55 are crimped fixedly in position.

Referring to Fig. 4, the pinion 55 meshes with the gear 59 rigidly connected to the pinion 60, rotating on the shaft 48. The pinion 60 in turn meshes with the gear 61, rigidly connected to the pinion 62, rotating on the shaft 56. The pinion 62 in turn meshes with the gear wheel 63 which is rigidly connected to the pinion 64 which meshes with the gear 65, the unit gear and pinion 63—64 rotating on the shaft 48 and the unit 65 with its rigidly connected hub 66 rotating on the shaft 56.

The end of the hub 66 (see Fig. 4) away from the gear 65 is provided with the ratchet teeth 67 which mesh with corresponding ratchet teeth 68 (see also Fig. 6) on the sleeve member 69, which sleeve member 69 is pinned at 70 to the shaft 56. The ratchet teeth 67 and 68 are normally maintained in inter-engaging relationship by the coil spring 71 which encircles the reduced diameter extension 72 of the sleeve member 69 and reacts between the cup 73 and the shoulder 74 (see Fig. 4). The interengaging ratchet teeth 67 and 68 will cause turning of the sleeve 69 and the shaft 56, to which said sleeve 69 is pinned at 70 when the hub 66 is turned through the gear train I. Carried by the sleeve 69 is the plate 75 which carries the stud 76 provided with the roller 77.

As indicated by the arrow 78 in Fig. 6 the stud 76 and the roller 77 are rotated slowly by the units 46—47, 54—55, 59—60, 61—62, 63—64 and 65—66 and through the intermeshing latch teeth 67 and 68.

As shown in Fig. 6 the stud 76 and the roller 77 are about to move the valve J in the direction indicated by the arrow 79.

Referring to Figs. 4, 6 and 8, the valve consists of a metal plate 80 which is recessed at 81. One edge 82 of the recess contacts with the roller 77 while another portion 83 of the recess 81 encircles the coil spring 84, which in turn encircles the pivot post 53. The other side 85 of the recess 81 serves as a reaction wall for the end 86 of the coil spring 84. The other end of the coil spring 87 reacts against the fixed pin 88.

The post 53, as shown in Fig. 4, has a reduced threaded portion 89 threaded into the tapped recess 90 in the lower end member 91 of the casing 28, which lower end member is bolted to the body of the casing by the screws 92 (see Figs. 2, 3 and 5). The pivot post 53 is also provided with an enlarged portion 93, around which closely fits the bore 94 of the valve plate 80.

The coil spring 84 (see Figs. 4 and 6) reacts between the bottom 95 of the recess 81 in the valve plate 80 and the ledge 96 at the top of the pivot post 53. The spring 84 by reason of the reaction of its ends 86 and 87 respectively against the wall 85 of the recess 81 and of the pin 88, and also its reaction against the bottom 95 of the recess 81 and the ledge 96 will serve both to bias the valve plate 80 so that its stop pin 97 will be pressed against the post 88 and also to press said valve plate 80 against the wall 98 of the end member 91.

As shown in Figs. 6 and 8, the valve carries the bores 99 and 100 which open at spaced points on the face of the valve 80 against the wall 98 to alternately serve as a connection between the bore 104 from the line L from the engine oil pump and the bore 103 to the air bell K and in its other position (as shown in Figs. 6 and 8) to establish communication between the bore 103 to the air bell K and the bore 102 to the distributing lines N.

Communicating with the bore 104 in the end member 91 is the bore 106 connected to the recess 107 (see Fig. 4), tapped at 108 to receive the nut 109 holding the fine mesh strainer screen 110 in position against the supporting cross mesh screen 111 on the shoulder 105.

The screen 110 (see Figs. 4 and 5) serves to strain out any relatively large particles of metal or dirt which may be fed by the engine oil pump into the line L before such lubricant is passed through the bore 104 and the valve 80 to the air bell K. The pipe L is held in a lubricant-tight fashion in the recess 112 by the double tapered coupling sleeve 113 and the nut 114.

As shown in Fig. 4 the bore 103 communicates with the bore 116 leading to the air bell K. The air bell K may consist of a unitary casting or other body member having a threaded connection at 117 in the tapped socket 118 in the end member 91.

When the air bell empties into the line, as shown in the position of Figs. 6 and 8, it will connect the bore 103 to the bore 102, which communicates with the tapped outlet socket 119, into which may be threaded the coupling nut 120 for the conduit N forming part of the lubricant distributing system on the chassis.

In operation, the generator shaft 24 (Fig. 7) will cause reciprocatory movement of the valve plate 80 (see Fig. 6) by rotating the arm 75 through the worm wheel 38 and the gear and pinion units 46—47, 54—55, 59—60, 61—62, and 63—64, and through the gear and ratchet construction 65—66.

The air bell, as shown in Figs. 6 and 8, will be normally connected to the distributing lines N of the chassis system by the bores 103, 100, 99 and 102 (see Figs. 4 and 8), and the valve will be in this position for most of the cycle of operation.

When, however, the roller 77 (Figs. 6 and 8) moves past the position of Fig. 6, the plate 80 will be moved into such a position that the inlet bore 104 will be connected to the air bell bore 103, with the result that the air bell K will be fed under engine oil pressure through the line L. This feed to the air bell K will only continue for a relatively short period, and soon after the roller 77 advances the face 82 in movement beyond the position of Fig. 6, the valve will snap back into its normal position due to the spring 84 and the air bell K will then discharge into the distributing lines N.

By suitably arranging the gear ratios and thereby providing a desired reduction, it is possible to assure that the chassis bearings will receive a shot of lubricant at predetermined intervals substantially dependent upon the number of miles of car travel.

The pressure available for forcing the lubricant into the lines in the embodiment shown in Figs. 1 to 8 will be the engine oil pressure, the energy of which will be stored in a compressed air pocket when the air bell is charged. It is desirable that the air bell K be quickly opened to the distributing lines N upon discharge thereof and this will be accomplished by the action of the spring 84 after the roller 77 passes off the face 82 of the recess 81.

It is thus apparent that the applicant has provided a method for taking substantially predetermined charges at substantially predetermined intervals from the engine oil pump, which charges may then be fed at substantially predetermined pressure into the chassis distributing lines over the relatively extended period of time during which the air bell is disconnected from the engine oil pump.

This arrangement assures that the engine oil pump will not be excessively drained when lubricant is being taken for feeding the chassis lines, and it also assures that a break in the chassis lines will not cause deprivation of the engine of its normal lubricant supply. In addition, substantially regardless of the viscosity of the lubricant in the chassis lines controlled by the varying atmospheric temperature, the charge of lubricant fed into the chassis distributing system will be relatively constant, in view of the fact that the air bell K is connected to the chassis distributing system a sufficient length of time to completely discharge at each lubricating period.

The arrangement of the passages 99—100 in the valve structure shown in Fig. 8 is advantageous inasmuch as it reduces the leakage area on the surface 98, the face of the valve 80 against the face 98 of the end piece 91 being subject to engine oil pressure. Any lubricant which leaks into the interior of the enclosure or body 28 housing the gear will serve advantageously to lubricant these gears and any excess will be conveniently relieved through the passage 30 (see Fig. 7).

These passages 99—100 may also be arranged as indicated at 99a—100a in Figs. 9 and 10.

It may be desired from time to time to test the system or assure an initial shot of lubricant upon initiation of operation. In such case, in the device of Figs. 1 to 8 the shaft 56 (see Figs. 2 and 4) may be extended as indicated at 130, to which extended portion is attached the knob 131, preferably externally knurled. The knob is fixed to the shaft end 130 by the set screw 132. By turning the device 131, it is possible to click the ratchet teeth 68 past the teeth 67 without movement of the gear train I and to move the roller 77 (see Figs. 4 and 6) until it is in the position of Fig. 6, whereupon the mechanism will cause the valve 80 to charge the air bell K and then discharge it to the chassis lines N. It is apparent that this operation will advance the valve J and shorten the interval between successive operations of the valve, since such valve would be operated at less frequent intervals through the gear train I.

Preferably corresponding markings are provided on the finger grip portion 131 and the face 133 of the body 28 which give an indication of the amount of time which must elapse before the next shot, or how far the manual device 131 must be turned to assure such a shot.

In Fig. 11 is indicated a typical flow metering device, of the restriction or drip lug type, which may be utilized in the chassis lubricating system at the positions O diagrammatically illustrated upon Fig. 1.

It is also to be understood, however, that other types of metering fittings may be utilized, such as restriction fittings of the types described in application Serial No. 580,668, filed August 9, 1922, now Patent No. 1,975,920, or measuring valve devices of the types disclosed in applications Serial No. 596,856, filed October 25, 1922, and Serial No. 9,544 filed February 16, 1925, now Patent No. 2,003,281.

In Fig. 11 the line N is connected to the body of the drip plug 135 by the compression coupling including the nut 136, the double tapered sleeve 137 and the bevelled thimble 138. The drip plug is provided with two cup-shaped inlet filter gauzes 139, a central bore 140 substantially filled by the pin 141 and with an outlet valve 142 firmly seated between periods of lubricant emission by the spring 143 reacting at its other side against the spring retainer 144.

The bearing structures F on the chassis or other mechanism being lubricated may be provided with tapped sockets 145, for receiving the threaded ends 146 of the drip plugs O and also provided with bores 147 leading to the bearing which receives the lubricant passing the drip plug.

The restriction passages in the drip plug preferably have a restricting effect at least ten (10) times of that of the longest length of line from the unit H to the bearing F and also ten times the restriction of the tightest bearing.

The restriction passages, however, formed by the pin 141 fitting in the bore 140 are regulated so as to have a diametral clearance of at least .003″ to .005″ and preferably not exceeding .007″ to .010″, so that the dirt or colloidal particles normally carried in engine oil will not serve to clog such passages during extended operation periods as would be experienced in connection with finer restrictions.

Moreover, the tapering or convergence of the inlet passage as indicated at 140a and the reciprocation of the pin 141 by the valve 142 in its reciprocatory opening and closing movements will assure that the restriction passage 140—141 will not clog and will maintain a substantially invariant restriction.

The device of Figs. 12 and 13 is of similar construction and operation to the device of Figs. 1 to 8 and similar functioning parts are designated by the same numerals and letters primed.

The device of Figs. 12 and 13 primarily differs from the device of Figs. 1 to 8 in the valve construction and in the manner of operating the same.

In Figs. 12 and 13 the last gear element 65′ is rigidly connected with two cam elements 150 and 151. Cooperating with these cams are the follower portions 152 and 153 of the levers 154 and 155, which levers are pivoted on the shaft 156 carried, as shown in Fig. 13, by the bore 157 in the side wall of the casing 28′ and by the bracket 157a.

The upper surface 158 of the lever 154 and the upper surface of the extension 159 of the lever 155, respectively contact with the valve rods 160 and 161 which pass through bores 162 and 163 in the body 28′ of the valve device. The lower ends of these bores around rods 160 and 161 are sealed by the cork or packing gaskets 164 which are held in position by the plates 165.

It will be noted that the section of Fig. 13 is offset so as to pass through both valve passages 160 and 163 in Fig. 12.

The rods 160 and 161 respectively move and permit closure of the inlet ball check 166 and the outlet ball check 167, which are seated by the springs 168 which at their other ends are received in the recesses 169 in the insert elements 170.

The left end of the lever 155 is provided with a boss 176 having an opening 177 which receives the upper end of the spring 178. The lower end 179 of the spring is hooked on the pin 180 fixed to the casing 28′. The spring 178 tends to press the cam follower portion 153 against the surface of the cam 151.

In Fig. 12, the cam follower portion 153 is just passing off the lobe 181 of the cam 151 and is about to drop down the shoulder 182 under the influence of the spring 178, with the result that the extension 159 will move upwardly, pressing the rod 161 up against the ball check 167 and opening said ball check. The shoulder 182 extends across both cams 150 and 151.

Just before the cams 150 and 151 moved to the position shown in Fig. 12, the cam follower portion 152 has moved off the lobe 183 and has dropped down the shoulder 182, thus permitting the spring 168 to close the ball check 166, which ball check has been previously opened by the lever 154 to permit charging of the air bell K'.

The inlet connection 109' feeds the inlet bore 171 which upon opening of the ball check valve 166 communicates with the bores 172 and 173, leading to the air bell K'.

After the air bell K' has been charged, the valve 166 will be closed and the valve 167 will be opened, permitting discharge of the air bell K' through the bore 173, the bore 174, and the outlet connection 175.

In the construction shown in Figs. 12 and 13, it is therefore evident that the inlet and outlet valves controlling the passages leading to and away from the air bell K' are positively closed by the springs 168 and that the possibility of leakage into the gear train chamber 28a (Fig. 12) of the casing 28' is lessened.

In addition, the lobe 183 of the cam 150 will assure proper opening of the valve 166 and substantially instantaneous closing thereof when the follower portion 152 passes up over the lobe 183 and then drops suddenly past the shoulder 182.

The lobe 181 of the cam 151 will correspondingly assure closure of the outlet check valve 167 shortly prior to the opening of the inlet check valve 166, since as the lobe 181 of the cam 151 will actuate the cam follower portion 153 before the lobe 183 actuates the cam follower portion 152.

At the same time, assurance is had that the inlet check valve 166 will close before the outlet check valve 167 will be opened, since the follower portion 153 will not drop down over the shoulder 182 until shortly after the follower portion 152 has dropped to the position shown in Figs. 12 and 13. It will be noted in both instances the ball checks 166 and 167 and the rods 160 and 161 are returned by the springs 168.

Fig. 22 diagrammatically illustrates the desired operation of the valves 166 and 167 of Figs. 12 and 13 in connecting the engine oil pump M to the air bell K' and then subsequently in dis-connecting said air bell from the engine oil pump and connecting it to the chassis distributing system.

The solid line 290 indicates the operation of the inlet valve 166 in connecting said accumulator or receiving chamber K' with the engine oil pump, while the dotted line or curve 291 represents the operation of the outlet valve 167 in connecting the chamber K' to the chassis lines. The upper level 292 indicates the open position of the connections while the lower level 289 indicates the closed position of the connections.

At the point 293 in Fig. 22, both valves 166 and 167 will be closed and if we represent the entire cycle of operations by 360° the valves 166 and 167 will both already have been closed for 35°. Then, as indicated by the rising portion 294 of the curve 290, the inlet connection to the air bell K' will be opened, while, as indicated by the portion 295 of the dotted curve 291, the outlet connection to the chassis lines will still remain closed.

Then, as indicated by the descending line 296, the inlet valve will be closed and shortly thereafter, say at an interval of 2° in the cycle the valve 167 will open the air bell K' to the chassis lines N, as indicated at 297. The outlet valve 167 will then remain open for substantially 290° of the cycle when it will be closed at the point 298, both valves then remaining closed until the point 293 is reached when inlet valve 166 will again be opened.

Although the diagram of Fig. 22 graphically illustrates the operation of the device of Figs. 12 and 13, the sharp opening of the outlet valve 167, as indicated by the line 297, is a desired feature which may be incorporated in the other embodiments of the present invention, already described or to be described, as is also the feature of permitting the chamber K' to communicate with the chassis lines for a major portion of the cycle of operation.

The device of Figs. 14 and 15 is of similar construction to the device of Figs. 1 to 8, and similar functioning parts are designated by the same numerals provided with a superior two.

The device of Figs. 14 and 15 is provided with a gear which permits direct drive from the cam shaft, distributor shaft, oil pump shaft, fan shaft, water pump shaft, or any other auxiliary shaft in or about the engine structure, and the accumulator or receiver structure in the device of Figs. 14 and 15 consists of a spring-returned piston device instead of an air bell as shown in the embodiments of Figs. 1 to 8.

Referring to Figs. 14 and 15, the casing $28^2$ is provided with a boss 190 which is shouldered at 191 received in the opening 192 in the engine housing $E^2$.

The drive shaft 193 is provided with a reduced portion 194 which is fixed at 195 to the gear wheel 196. The gear wheel 196 is substantially inside of the engine housing $E^2$ and conveniently may be meshed with a worm cut upon any suitable shaft mentioned above. The shaft 193 bears within the opening 197 in the tubular extension 198 of the body $28^2$ of the valving device $H^2$.

The shaft 193 at its opposite end is provided with a recess 199 into which is press-fitted the stud 200 carrying the bearing washer 201 turning in the recess 202 in the interior wall of the casing $28^2$ and the right end of which is formed into the pinion $47^2$.

The gear $65^2$ by the sleeve $66^2$ carries the plate 203 which is provided with the annular band of ratchet teeth $67^2$, which engage with the toothed element $68^2$ on the sleeve $69^2$ fixed to the shaft $56^2$ by the pin $70^2$.

In Fig. 14 the elements $68^2$ and $77^2$ are shown somewhat out of position to enable a clearer illustration, and in the actual structure preferably two toothed elements 68 are provided positioned 180° apart and the roller $77^2$ is spaced midway between said legs or elements. The recess 204 for the accumulator $K^2$ is tapped at its outer end 205 and is closed by the plate 206 and the gasket 207.

Fitting within the recess 204 is the piston 208 provided with the packing cup 209, which packing cup 209 and piston 208 are held, together with the retainer 210 for the spring 211, by the central element 212.

The other end of the spring 211 is fixed by the elevated boss 213 on the retainer plate 214 in the bottom of the recess 204.

By the use of a spring-returned piston 208 it is possible to regulate the spring 211 to assure a predetermined discharge pressure from the air bell from the receiver chamber K² different from the engine oil pressure.

Contrary to the air bell position of the devices of Figs. 1 to 8 and Figs. 12 and 13, it is desirable to turn the inlet side of the pressure receiver K² upwardly since it is undesirable to trap air therein. The construction as shown is automatically air-excluding and any air which passes into the receiver K² will be swept out by the next charge of oil passing therethrough.

The manual indicator 131² in the construction of Figs. 14 and 15 conveniently takes the form of an L-bent portion of the shaft 59² and the end element 91² is exteriorly provided with a lug 215 which permits a ready determination of the position to which the lever 131² should be moved to secure a shot at will. The arrow 216 indicates the direction of movement of the lever 131² and also indicates how the lever 131² should be moved by the operator upon test or to secure an initial shot of oil to the chassis bearings when the automobile is started.

During operation, the lever 131² will slowly rotate and this constant rotation will assure the operator of the car that the lubricating mechanism is functioning.

In Fig. 14 the piston chamber 204 may have a vent passage 421 leading into the interior of the casing 28², and the interior of the casing may conveniently be provided with the drain passage 420 returning to the crank case E². The stroke of the piston 208 may be controlled by the depth of the cup 210.

The raised surface 422 may conveniently receive an instruction plate indicating that the operator, for manual operation with the engine running, should turn the handle 131² until opposite boss 215 and then release it for fifteen seconds, or more, to permit the accumulator 204 to be charged. Then the operator should advance handle half turn to discharge accumulator to the bearings.

It is apparent in view of the inter-engaging of teeth 67² with element 68² (also in Fig. 4 in view of the teeth 67 and 68), the handle 131² can only be turned in the direction of the arrow 216 and not reversely.

Fig. 16 shows a metering and valving unit of the type indicated in Figs. 14 and 15, similar functioning parts being designated by the same numerals provided with a superior three.

In the construction indicated in Fig. 16, the fan 217 driven by the belt 219 and by the pulley 223 sets up a blast of air 218 which has been drawn past the radiator (not shown) and this blast of air actuates the impeller fan 221 connected to the shaft 193³ bearing in the extension 198³ from the housing 28³ of the valving device H³.

The fan 217 will maintain a substantially continuous air current when the engine is operating, which current will be increased when the automobile is being driven at high speeds, and which blast of air will also be slightly decreased in winter time in most automobiles, due to the provision of a protecting front for the radiator to lessen the current of air flowing therethrough at winter temperatures.

These fan characteristics are particularly advantageous in chassis systems, since it is often desired to supply greater amounts of oil to the chassis bearings when the automobile is being driven upon the open road as contrasted when it is being driven in the city or through traffic.

Also since in winter time the increased viscosity of the oil will cause it to be retained in the chassis bearings for longer periods of time, it is possible to somewhat decrease the amount of oil fed to the bearings, which will be readily accomplished by partial closure of the radiator openings with shutter fronts if desired.

The power necessary to turn the valve of the device H³ of Fig. 16 is so small, due to the tremendous reduction in the gear train, that no difficulty is experienced in driving the mechanism by an air current of the character shown and described.

In Fig. 17 (in which similarly functioning parts are designated by the same numerals and letters with a superior four) the distributing receiver K⁴ is provided with a bellows or Sylphon 222 consisting of sheet brass or copper folded into the corrugated form 223. The end of the bellows or Sylphon 222 is provided with a boss 224, contacting the base of the recess, as indicated at 225.

The end of the receiver chamber K⁴ is closed by the plug member 226 which is provided with a central opening 227 to receive the axial stud or pin 228 acting as a stop to limit rightward contraction movement of the Sylphon 222 and the maximum charge of the Sylphon chamber K⁴. The plate 229 is adapted to contact with the end of the axial stud 228 when the Sylphon has moved to the maximum charge position. The enclosed coil spring 231 is positioned at one end on the boss 232 on the end member 226 and at the other end on the boss 233 on the stop plate 229.

The inlet passage 116⁴ and the receiver K⁴ are preferably positioned so that all air which accumulates in the chamber will be conveniently swept therefrom by the successive charges of oil fed thereinto and therefrom.

Fig. 18 shows substantially the same construction as Fig. 17, except that the central axial stop stud 228 has a threaded continuation 234 through the center of the closure plate 226, which extension projects beyond the closure plate 226 and is provided with a fillister slot 235 enabling convenient adjustment of the stop 228, the stop in its adjusted position being conveniently locked in position by the lock nut 236.

In the position shown in Fig. 18, the Sylphon is shown adjusted to its maximum stroke, which is indicated by the fact that the extension 237 of the threaded element 234 projects its maximum distance beyond the lock nut 236. The stop element may be adjusted inwardly, if desired, by loosening the lock nut 236 and applying a screw driver, or other tool, to the slot 235.

In the embodiment of Figs. 19 and 20, the distributing receiver and valving device is driven by the flow of oil from the engine oil pump, similarly functioning parts in this embodiment being designated by a superior five.

The receiving distributing device K⁵ may conveniently include a diaphragm (the details of which are not shown), which is preferably spring-loaded, the diaphragm chamber being charged with displacement of the diaphragm against the spring upon opening of the chamber to the engine oil pump and being displaced in the opposite direction when the spring is released upon discharge into the distributing lines.

The engine oil is fed from the engine oil pump (see M on Fig. 1) through the passage 245 in the engine structure E⁵. Connected to the passage 245 are the bores 246 and 262, the bore 246 leading to the relief valve 247 and the bore 262, communicating with the bores 260, 261, 262, 263, 264, which feed the receiver device $K^5$. The relief valve is provided with a seat 248 fitted into the bottom of the recess 249, which recess receives the coil spring 250 retained in place by the nut member 251, having a nipple 252.

The bore 253 leading from the valve chamber 249 feeds the intercommunicating bores 254, 255 and 256 in the body $28^5$ of the metering unit $H^5$. The bore 256, as indicated in Fig. 20 opens eccentrically into the circular recess 257 which receives the flow impulse device 258 axially supported at 259. The oil under pressure after having passed through the impeller 258 is received in the chamber 260a from whence it is returned to the crank case of the automotive vehicle.

The relief valve 247 may serve as the usual engine oil relief valve.

It has been found in operation that the relief valve 247, if the usual engine relief valve, will open sufficiently to assure substantially continuous rotation of the impulse wheel 258. The valve 247 during operation of the automotive vehicle will relieve a greater amount of lubricant at high engine speeds than at low engine speeds, and correspondingly the impulse wheel 258 will be driven at a higher speed when the automotive vehicle is being driven on the open road at a high engine speed than when the engine is idling.

The device of Fig. 21 is of similar construction to the device of Figs. 1 to 8, (similarly functioning parts being designated by the same numerals or letters provided with a superior six) except that the engine oil pressure serves to seat the valve plate $80^6$ against the surface $98^6$. The valve plate $80^6$ is provided with a bore $99^6$ which in the position shown establishes communication between the chamber 270 and the air bell $K^6$. The chamber 270 is in communication with the engine oil pump through the inlet connection $109^6$ and the bore $106^6$. The valve plate $80^6$ is pressed against the face $98^6$ by the spring 271, which is positioned and retained between the projection 272 on the rear of the valve plate $80^6$ and the cupped plate 273.

The plate 273 is provided with a central depression 274, into which projects the boss 275 serving as a pivot mount for the plate 273. The boss 275 is carried on the closure 276, which screws into the threaded recess 277 in the end member $91^6$ of the valving device $H^6$.

The face of the valve plate $80^6$ pressed against the face $98^6$ of the end member $91^6$ is provided with the intersecting bores or an arcuate groove (not shown) similar to bores 99—100 of Fig. 8, or the groove 99a—100a of Figs. 9 and 10.

These bores or groove will establish communication between the bore $104^6$ and the bore $102^6$ when the air bell $K^6$ is cut off from the chamber 270 and accordingly from the engine oil pump. The outlet bore $102^6$ communicates with the outlet connection $119^6$.

The ratchet construction for driving the valve is of the same type shown in Fig. 14, the sleeve $69^6$ fixed to the shaft $56^6$ carrying the ratchet legs with the teeth $68^6$. The intermediate roller element $77^6$ causes movement of the valve plate $80^6$.

The valve plate $80^6$ is driven through the shaft $53^6$ which has a keyed connection 280 to said valve plate. The shaft $53^6$ is received in the bore 281 in the end body element $91^6$.

To the shaft $53^6$ is rigidly connected the plate 282 which is provided with an extension 283 normally pressed against the post $88^6$ by the end $86^6$ of the spring $84^6$. The end $87^6$ of the spring $84^6$ is received in a recess 284. The body of the spring is located and received on the sleeve 285 encircling the shaft $53^6$.

The spring $84^6$ normally retains the valve plate $80^6$ in such position that the bores $104^6$, $102^6$ will be in communication. At intervals the air bell $K^6$ will be recharged when the follower $77^6$, which is shown in dotted lines in Fig. 21 ninety degrees out of position, contacts with the plate 282 and moves said plate and said shaft $53^6$ to the position of Fig. 21 in which the bore $99^6$ will establish communication between the chamber 270 and the bore $104^6$ leading to the air bell $K^6$, whereby said air bell may be recharged.

Figs. 23 to 29 illustrate various alternative constructions or alternative applications of the embodiments shown and described in connection with Figs. 1 to 22.

In Fig. 23 the metering unit $H^2$ (already described in connection with Figs. 14 and 15), is driven from the speedometer shaft (not shown) enclosed in the cable casing 305, said casing extending past the dashboard 306 to the speedometer dial 307 on the instrument board 308. The device $H^2$ receives its supply of oil from the lines 309, 310, leading from the engine oil pump to the oil pressure gauge 311 on said instrument board 308.

Fig. 23 therefore illustrates a convenient method of locating the metering and valving unit of the present invention on the dashboard where it is conveniently accessible and actuating and feeding it from the adjacent speedometer drive shaft and oil feed to the gauge normally positioned on the instrument panel of the automotive vehicle.

If desired, the feed of oil to the oil gauge 311 may be so regulated that the opening of the accumulator chamber of the device $H^2$ would be immediately apparent to the operator of the automotive vehicle by a sudden shift in the needle of the oil gauge 311, or by the application of another needle to the oil gauge 311, thus assuring the operator of the car that the chassis is being lubricated. This would also enable a convenient check by the operator of the car, or by one testing the chassis system of the number of lubrications of the chassis per unit time or per unit distance.

The unit $H^2$ in Fig. 23 might also be mounted at other positions on the speedometer shaft or the speedometer shaft might be divided with one element extending to said unit $H^2$ and the other to the dial 307.

In Fig. 24 is diagrammatically illustrated an alternative construction for feeding the chassis lines from the engine oil pump by a measuring valve construction. The line 312 from the engine oil pump is provided with a valve seat element 313 normally closed by the ball check 314 provided with the seating spring 315. The ball check 314 may be elevated from its seat by the rod 316 which is connected to the diaphragm 317 to assure a liquid tight enclosure.

The rod 316 has an extension 318, which rests upon the contact member 319 of the lever 320, pivoted at 321. The other arm 322 of the lever 320 follows the cam 323, which is driven from the shaft 324, such as for example, the cam shaft, the distributor shaft, the oil pump shaft, the water pump shaft, or the generator shaft through a gearing train, as illustrated in the embodiments of Figs. 1 to 21.

When the lever arm 322 drops into the position shown in Fig. 24, the contact element 319 will be elevated by the reaction of the spring 325 against the fixed mount 326. This will elevate the valve 314 from its seat 313.

As a result, engine oil pressure will be applied to the valve chamber 327 containing the piston 328 of the measuring valve, forcing the piston 328 to the right displacing any oil in the right chamber 329 through the outlet connection 330 and past the spring seated outlet check valve 331 into the passageway 333, leading to the chassis lines. At the extreme right movement of the piston 328, the valve face 334 on said piston will close the chamber 329 from the outlet connection 330 by closing the end 335 of the connection 330.

The spring 336 serves to return the piston 328 after the valve 314 has closed, the oil in the left enclosure 327 returning through the clearance 336 to fill the chamber 329.

The measuring valve 328, as diagrammatically shown in this view, if desired, may take any of the forms illustrated in copending applications Serial No. 596,856, filed October 25, 1922 and Serial No. 9,544, filed February 16, 1925, but of such enlarged capacity as to carry a sufficient charge for all the chassis bearings of the vehicle to be lubricated.

In Fig. 25 the engine body 340 is provided with an inlet opening 341 which coincides with the opening 342 in the upper side wall of the pocket 344. The lubricant receiver or pocket 344 is adapted to be connected to the side of the engine housing 340 and the oil supplied to the engine crank case is first passed through said pocket 344, which will trap a predetermined quantity for supply to the chassis bearings during the intervals between supply of oil to the engine crank case.

The metering valve unit H, which may be of any of the constructions illustrated in Figs. 1 to 21, and the gear pump or other rotary pump unit 349 are joined together and preferably immersed in the bottom of the pocket 344. The pump 349 and the unit H are driven together by the shaft 345 having the gear wheel 346 actuated by the worm 347 on the shaft 348 which may be the distributor, generator, or cam shaft, as illustrated in Fig. 14. The pump 349 is preferably provided with a felt inlet filter (not shown) associated with the inlet 400 and a pressure relief valve 401.

By the construction shown in Fig. 25, it is possible to assure a supply of clean oil to the valve device and to the chassis lines, and with such a unit it is possible to use drip plug or restriction devices with more restricted passages because of the decreased tendency toward clogging.

The trap 344 may also take the various forms disclosed in copending application Serial No. 517,687, filed February 24, 1931.

In Fig. 26 is diagrammatically shown an embodiment for utilizing the engine oil pump to produce an increased pressure to supply the metering and valving device of the application.

In Fig. 26 the engine oil pump 350 is driven by the shaft 351 and discharges in the line 352. The line 352 is provided with a branched connection 353 to the metering device H of the present invention.

The line 352 is provided with the spring seated loading valve 354 (having a loading spring, for example, of 15 to 30 pounds per square inch) which causes the engine oil pump to maintain a pressure in the line between the valve 354 and the outlet of the pump 350 substantially higher than the normal engine oil pressure, which may be between 5 and 20 pounds per square inch for some makes, each having a pump maintaining a relatively constant pressure within this range.

For example, a relatively constant pressure between 20 to 50 pounds may be maintained below the valve 354 and on the pipe 353, and such an increased engine oil pressure supplied through the line 353 to the metering and valving device of the present invention. The intermediate valve 354 will permit flow into the line 355 to feed the engine bearings at relatively constant normal engine pressure between 5 to 20 pounds. The usual spring seated relief valve 356 (having a loading spring between 5 to 20 pounds) with the return 357 to the crank case may be provided as indicated.

In Fig. 27 the engine oil pump 360 is provided with the inlet 361 to feed to the conduit 362 leading to the engine bearings and superimposed upon or connected to the engine oil pump casing is a high pressure rotary or reciprocating pump 363 driven by the same shaft 364. The high pressure pump 363 is provided with an inlet line 365 from the engine oil sump and it discharges at a substantially higher pressure than engine oil pressure into the line 366 provided with the pressure relief valve 402 to the metering and valving unit of the present application diagrammatically indicated at 440 which may be of the construction and operated as already described in Figs. 1 to 21 and 23 to 25.

In Fig. 28 the metering and valving unit 370, shown connected to the side wall 371 of the engine housing and its shaft 372, is driven by the spring coupling 373 from a suitable shaft 374 in the engine enclosure, such as the cam shaft or fan shaft.

Instead of having a gearing train of the character described in connection with Figs. 1 to 21, the shaft 372 carries a worm 375 which meshes with the gear wheel 376. The gear wheel 376 is in turn provided with a worm 377 driving the wheel 378, which in turn drives the worm 379. The worm 379 drives the gear wheel 380. The gear wheel 380 is rigidly connected to the cam 381, which may actuate the valve devices, such as the valves 166 and 167, shown in Figs. 12 and 13, or the valve device 314 of Fig. 24.

The cam 381 is preferably of such design that the outlet valve to the chassis lines will remain open about 80% of the cycle.

In Fig. 28 the accumulator chamber is shown as provided with a diaphragm 382 against which reacts the spring 383, said diaphragm being of similar construction to and provided with substantially identical connections, as the diaphragm device $K^5$ of Figs. 19 and 20.

The diaphragm chamber is preferably in inverted position at the bottom of the unit to exclude air.

Other types of reductions than shown in Figs. 4, 12, 14, 21 and 28 might also be employed such as those including various combinations of planetary gears, worms and wheels, multiple worms, spur gear units, friction discs, Geneva motions, and so forth.

In Fig. 29 is diagrammatically shown the manner in which the metering device of the present invention is applied to the lubrication of industrial machinery. In the device of Fig. 29 the metering unit 390 of the same or similar construction as the devices H to $H^6$ of Figs. 1 to 21 is provided with a gear pump unit 391 which receives its lubricant supply from the reservoir or well 392, which, if desired, may be formed in a pocket in the structure of the mechanism to be lubricated whether it be a machine tool, printing press, or some other mechanism requiring lubrication. The pump 391 may be conveniently provided with a pressure relief valve (not shown).

The cover 393 carries the actuating shaft 394 which may be connected to any suitable shaft on the machine or which may be separately actuated by an electric motor or some other means, and the shaft 394 drives the connecting shaft 395 and the gearing arrangement 396. The gearing 396 actuates the metering device 390 and the gear pump 391.

The metering device 390 and the gearing 391 are conveniently supported from the cover 393 by the legs 397 so as to enable said device to be conveniently positioned in the enclosure 392 or in a similar reservoir pocket in or about the machine to be lubricated.

In applying the metering and valving device of the present application to automobile chassis lubrication and in feeding it from and under the pressure of the engine oil pump, it has been found most satisfactory to construct the air bell, diaphragm chamber, piston chamber or Sylphon chamber so that they will receive and then subsequently discharge a volume of lubricant between about 4 and 10 c. c., preferably about 4 or 6 c. c., which volume is sufficient to supply about 20 bearings for about an hour or a 40 mile run.

The chassis bearings usually included are 12 spring hinge and shackle bearings, 1 anti-kick shackle bearing, 4 king pin bearings, 2 thrust king pin bearings, and 1 clutch release bearing with the usual type of front axle suspension. With independent wheel suspensions the corresponding bearings are supplied.

The volume of the air bell, piston, Sylphon or diaphragm chamber or measuring valve is so regulated that its normal charge and discharge will be substantially in excess of the resiliency of the line. For example, with a typical line of copper or brass tubing of $\frac{5}{32}''$ O. D. and 0.106'' I. D., the line volume will be about 80 c. c. and line resiliency will be about 2 c. c.

At the same time the volume of charge and discharge should not be sufficiently appreciable to decrease the feed of the engine oil pump to the engine bearings when the receivers K to $K^6$ are charged.

These considerations make the above mentioned range of 4 to 10 c. c. for the charge and discharge of the air bell a most desirable one. Moreover, with this feed to the chassis bearings about every forty miles assurance is had that the chassis bearings will not be so insufficiently lubricated to cause them to run dry in the interval as might possibly occur in the case of longer intervals, say 500 miles, nor so excessively lubricated that the chassis bearings will not retain the lubricant, but would permit it to escape with undesirable waste and drippage over the exterior of the automobile.

The average charge and discharge volume of 4 to 10 c. c. above suggested in addition is particularly adapted to the conditions obtaining with the usual grade of engine oil varying in viscosity from 300 to 600 Saybolt seconds at 100° F. for winter to summer conditions respectively.

With drip plugs as shown in Fig. 11 under the conditions above stated, it is desirable to regulate the strength of the valve springs 143 of Fig. 11 to be between about 1 and 5 pounds, preferably about 2 pounds, since this will assure most satisfactorily sufficient movement of the pin 141 to prevent clogging of the restriction passage.

Preferably receiver devices H to $H^6$ are connected to the actuating shaft and provided with such reductions as to charge and discharge once for every 200,000 revolutions of generator shaft, once for every 50,000 revolutions of the cam, distributor or oil pump shafts, once for every 100,000 revolutions of the crank shaft, or once for every 35,000 revolutions of the speedometer shaft.

Where uncleansed or unpurified engine oil is used, the restriction passage in the drip plug fittings is preferably maintained at between .003 to .010 of an inch diametrical clearance while with the cleansed oil the restriction may be much higher.

It is to be understood that the various types of accumulator or receiver chambers, whether of the air bell, diaphragm, piston, or Sylphon type, as disclosed in Figs. 4, 5, 12, 13, 14, 17, 18, 20 and 28, may be interchangeably utilized with the different types of valves described, as for example, in Figs. 6 and 8, Figs. 12 and 13, and Fig. 21, and that the air bells, diaphragm piston or Sylphon chambers of Figs. 1 to 21 may be replaced by a measuring valve device, as shown in Fig. 24, in connection with the embodiments of Figs. 1 to 21.

Other types of rotary pumps, than gear pumps or even reciprocatory spring-loaded piston pumps, may be employed to supply the units H to $H^6$ of Figs. 1 to 21, or in lieu of the gear pumps 349 of Fig. 25, 363 of Fig. 27 and 391 of Fig. 29.

The plate valves 80 of Figs. 1 to 8, Figs. 14 and 15, and Fig. 21, may be replaced by ball checks, one for each connection, as shown in Figs. 12 and 13, or soft seated spring-returned flat or disc valves may be employed in lieu of such ball checks.

The various types of drives shown in Figs. 4 and 7, in Fig. 14, in Fig. 16, in Figs. 19 and 20, and in Fig. 23 may be interchangeably utilized, and the clean oil pocket with the independent pump 349, as indicated in Fig. 25, may also be utilized in connection with the devices of Figs. 1 to 21 and 23.

The devices H to $H^6$ may also be driven from other sources of power in and about the automobile vehicle than the various shafts above mentioned when the pump is operating. Suitable power connections with or without reductions, sensitive to the varying pressure in the intake manifold, the engine cylinders, or the exhaust manifold, to the brake or clutch pedals, to the vehicle springs or axles, or to an inertia device might be employed constructed along the lines shown in copending applications Serial No. 262,123, filed March 16, 1928, Serial No. 323,867, filed December 5, 1928, Serial No. 468,790, filed July 18, 1930, Serial No. 285,526, filed June 5, 1928, or in Patents No. 1,968,023 and No. 1,979,247.

The power required to drive the valve plates 80 to $80^6$ is so small that a wide variety of couplings, such as belt drives (as from the belt 219 of Fig. 16) rubber tubing or face to face friction drives, may be used instead of the slotted coupling 31—32 of Fig. 7 or the spring coupling 373 of Fig. 28.

The arrangements of Figs. 26 and 27 for assuring a higher pressure than normal engine oil pressure may also be employed in connection with Figs. 1 to 21 and 23.

Other accumulators, such as described in applications Serial No. 362,123, filed March 16, 1928 and Serial No. 323,867, filed December 5, 1928, may also be employed in place of the air bells, Sylphon chambers, piston chambers and diaphragm chambers described in the present application.

What is claimed is:

1. In an automotive vehicle of the type having an engine with an auxiliary shaft, an engine oil reservoir and an engine oil pump driven from said engine and receiving lubricant from said engine oil reservoir and also having a chassis distributing system with flow metering outlets feeding the chassis bearings; the combination therewith of a valving and metering unit for said chassis system including a distributing receiver chamber, an inlet to said chamber from the engine oil pump, an outlet to the chassis system from said chamber, valve means for opening said inlet to said chamber for a relatively short period of time and at the same time for closing said outlet, and also for opening said outlet for a relatively long period of time and at the same time closing said inlet, and means to actuate said valve means driven from said auxiliary shaft, including a train of clock gear units, each consisting of a large driven gear wheel and a small rigidly connected driving pinion, said gears being mounted loosely on adjacent parallel shafts with the driving pinions of one clock gear unit meshing with the gear wheel of the next gear unit, whereby a compact gear assemblage is obtained capable of high reduction, said unit having a compartment receiving said gear assemblage and a structure at one side of said compartment receiving said chamber and a detachable screw cap for said chamber.

2. In an automotive vehicle of the type having an engine with a fluid power source and an engine oil reservoir supplying lubricant to the engine and also having a chassis distributing system with flow metering outlets feeding the chassis bearings; the combination therewith of a valving and metering unit for said chassis system including a distributing receiver chamber, provided with resiliency to store lubricant and subsequently discharge it under pressure, an inlet to said chamber from the engine oil reservoir, an outlet to the chassis system from said chamber, valve means for opening said inlet to said chamber and for closing said outlet for a relatively short period of time and subsequently for opening said outlet and simultaneously closing said inlet for a relatively long period of time, and means to actuate said valve means being driven from said power source.

3. In an automotive vehicle of the type having an engine with a generator having a shaft, an engine oil reservoir and an engine oil pump driven from said engine and receiving lubricant from said engine oil reservoir and also having a chassis distributing system with drip plug outlets feeding the chassis bearings; the combination therewith of a valving and metering unit for said chassis system including an air bell chamber, an inlet to said air bell from the engine oil pump, an outlet to the chassis line from said air bell, a plate valve controlling said inlet and outlet for opening said inlet to said air bell and for closing said outlet for a relatively short period of time and for opening said outlet and closing said inlet for a relatively long period of time, and a reduction gear train to actuate said plate valve driven from said generator shaft, including a train of clock gear units, each consisting of a large driven gear wheel and a small rigidly connected driving pinion, said gears being mounted loosely on adjacent parallel shafts with the driving pinions of one clock gear unit meshing with the gear wheel of the next gear unit, whereby a compact gear assemblage is obtained capable of high reduction, said unit having a compartment receiving said gear assemblage and a structure at one side of said compartment receiving said chamber and a detachable screw cap for said chamber.

4. In an automotive vehicle of the type having an engine with a generator shaft, an engine oil reservoir and an engine oil pump driven from said engine and receiving lubricant from said engine oil reservoir and also having a chassis distributing system with flow metering outlets feeding the chassis bearings; the combination therewith of a valving and metering unit for said chassis system including a resiliently charged and discharged chamber, a plate valve, a conduit from said plate valve leading to said chamber, an inlet passage to said valve from the engine oil pump, an outlet passage to the chassis line from said valve, means to actuate said plate valve alternately for opening said inlet passage to said chamber and for closing said outlet passage for a relatively short period of time and subsequently for opening said chamber to said outlet passage and simultaneously closing said inlet passage for a relatively long period of time, said means to actuate said plate valve being in turn actuated from said generator shaft, said last mentioned means including a worm drive, a train of intermeshing gears and pinions, a toothed connection, a contact element on said valve, a contact element on said toothed connection, said contact elements cooperating to turn the valve, and a spring for returning the valve, and manual means to advance said contact element on said ratchet connection.

5. In an automotive vehicle of the type having an engine, a source of lubricant and a source of power; the combination therewith of a chassis lubricating installation including a branched distributing drip plug system leading to the chassis bearings, and a unit comprising an air bell chamber, an inlet connection to said air bell chamber from said source of lubricant and an outlet connection from said air bell chamber to said system, a valve arrangement for controlling said inlet connection and said outlet connection and a gear train to actuate said valve arrangement driven by said source of power, including a train of clock gear units, each consisting of a large driven gear wheel and a small rigidly connected driving pinion, said gears being mounted loosely on adjacent parallel shafts with the driving pinions of one clock gear unit meshing with the gear wheel of the next gear unit, whereby a compact gear assemblage is obtained capable of high reduction, said unit having a compartment receiving said gear assemblage and a structure at one side of said compartment receiving said chamber and a detachable screw cap for said chamber, said valve arrangement controlling said inlet connection and said outlet connection to open said inlet connection and close said outlet connection for a relatively short period of time and then to close said inlet connection and open said outlet connection for a relatively long period of time.

6. In an automotive vehicle of the type having an engine, a generator with a shaft, an engine oil pump and an engine oil reservoir from which said engine oil pump receives its supply of lubricant; the combination therewith of a chassis lubricating installation including a branched distributing system leading to the chassis bearings, and a unit comprising an air bell chamber, an inlet connection to said air bell chamber from said engine oil pump and an outlet connection from said air bell chamber to said system, a valve arrangement for controlling said inlet connection and said outlet connection and a gear train to actuate said valve arrangement driven by said generator shaft, including a train of clock gear units, each consisting of a large driven gear wheel and a small rigidly connected driving pinion, said gears being mounted loosely on adjacent parallel shafts with the driving pinions of one clock gear unit meshing with the gear wheel of the next gear unit, whereby a compact gear assemblage is obtained capable of high reduction, said unit having a compartment receiving said gear assemblage and a structure at one side of said compartment receiving said chamber and a detachable screw cap for said chamber, said valve arrangement controlling said inlet connection and said outlet connection to open said inlet connection and close said outlet connection for a relatively short period of time and then to close said inlet connection and open said outlet connection for a relatively long period of time.

7. In an automotive vehicle of the type including an engine and an engine oil pump; the combination therewith of a chassis lubricating installation including a branched distributing system, a distributing receiver connected to the inlet of said system, an inlet connection to said receiver from said engine oil pump, an outlet connection from said receiver to the lines of said chassis lubricating system, valve means to alternately open and close said connections, a reduction gear train to actuate said valve means, a fluid impeller to drive said train, and means to actuate said impeller, in turn actuated upon operation of the automotive vehicle.

8. In an automotive vehicle of the type including an engine, an engine oil pump and a fan driven by said engine; the combination therewith of a chassis lubricating installation including a branched distributing drip plug system, a distributing receiver connected to the inlet of said system, an inlet connection to said receiver from said engine oil pump, an outlet connection from said receiver to said chassis lines, valve means to alternately open and close said connections, a reduction gear train to actuate said valve means, and an air impeller to drive said train, said impeller being positioned to be actuated by the blast of air set up by said fan.

9. In an automotive vehicle of the type having an engine, an engine oil pump, an instrument board carrying a speedometer and an engine oil pressure gauge, a speedometer shaft extending past the dashboard to said speedometer, and a line from the engine oil pump extending past the dashboard to said engine oil gauge; the combination therewith of a chassis lubricating installation comprising a branched pipe system with an inlet and a plurality of drip plug outlets to the chassis bearings, a distributing receiver connected to said inlet, an inlet connection to said receiver from said engine oil line, an outlet connection from said receiver to the pipe system, and valve means to alternately open and close said outlet and inlet connections, said valve means being actuated from the speedometer shaft.

10. In an automotive vehicle, a chassis lubricating installation comprising a central pump, a branched pipe system with an inlet and a plurality of drip plug outlets to the chassis bearings and a unit comprising a resiliently charged and discharged distributing receiver chamber fed from said pump and feeding said system, an inlet connection to said receiver chamber from said pump, an outlet connection from said receiver chamber to the chassis piping system, and valve means to control said outlet and inlet connections, said valve means and said pump being actuated by gearing driven by said engine, including a train of clock gear units, each consisting of a large driven gear wheel and a small rigidly connected driving pinion, said gears being mounted loosely on adjacent parallel shafts with the driving pinions of one clock gear unit meshing with the gear wheel of the next gear unit, whereby a compact gear assemblage is obtained capable of high reduction, said unit having a compartment receiving said gear assemblage and a structure at one side of said compartment receiving said chamber and a detachable screw cap for said chamber, said valve means controlling said outlet and inlet connections to open said inlet connection and close said outlet connection for a relatively short period of time and to open said outlet connection and to close said inlet connection for a relatively long period of time.

11. In a mechanism having bearings to be lubricated, a central lubricating installation comprising a central pump, a branched pipe system with an inlet and a plurality of outlets to the bearings of the mechanism to be lubricated, a unit comprising a resiliently charged and discharged distributing receiver chamber charged from said pump and discharging to said system, an inlet connection to said receiver chamber from said pump, an outlet connection from said receiver chamber to the system, and valve means to control said outlet and inlet connections, including a train of clock gear units, each consisting of a large driven gear wheel and a small rigidly connected driving pinion, said gears being mounted loosely on adjacent parallel shafts with the driving pinions of one clock gear unit meshing with the gear wheel of the next gear unit, whereby a compact gear assemblage is obtained capable of high reduction, said unit having a compartment receiving said gear assemblage and a structure at one side of said compartment receiving said chamber and a detachable screw cap for said chamber, said valve means and said pump being mechanically driven by said mechanism, said valve means controlling said outlet and inlet connections to open said inlet connection and close said outlet connection for a relatively short period of time and to open said outlet connection and to close said inlet connection for a relatively long period of time.

12. In combination with a chassis lubrication system, a central metering and supply unit including a pump, a resiliently charged and discharged chamber fed from said pump, and valve controlled inlet and outlet connections respectively to said unit from the pump and from said unit to said system, said valve controls and said pump being automatically actuated to feed said chassis system at predetermined intervals, said unit being driven by an impeller wheel and means automatically actuated to direct a flow of fluid upon and through said impeller wheel.

13. In combination with a chassis lubrication system, a central metering and supply unit including a pump, a resiliently charged and discharged chamber fed from said pump, and valve controlled inlet and outlet connections respectively to said unit from said pump and from said unit to said system, said valve and said pump being automatically actuated to feed said chassis system at intervals and for periods determined by the operation of the vehicle and manual means to actuate said valve to feed said system at more frequent intervals.

14. The method of operating a drip plug lubricating system of fixed resistance type, which consists in segregating small charges of lubricant at intervals and for periods determined by the operation of the mechanism being lubricated, while storing pressure on the segregated charge and completely delivering the segregated charge under said pressure into the distributing system before segregating the succeeding charge.

15. An automobile lubricating system comprising drip plugs at various chassis bearings, a distributing main having branches delivering to said drip plugs, an engine lubricating system including an engine oil pump, a unit for feeding oil from said pump to said main, said unit including a resilient oil chamber, a valve normally closing the resilient chamber from the oil pump, said chamber normally having open communication to said main, and power driven means for periodically operating said valve to close off the resilient chamber from the main and at the same time open the connection from the engine oil pump to the chamber during a relatively short interval, including a train of clock gear units, each consisting of a large driven gear wheel and a small rigidly connected driving pinion, said gears being mounted loosely on adjacent parallel shafts with the driving pinions of one clock gear unit meshing with the gear wheel of the next gear unit, whereby a compact gear assemblage is obtained capable of high reduction, said unit having a compartment receiving said gear assemblage and a structure at one side of said compartment receiving said chamber and a detachable screw cap for said chamber.

16. In an automotive vehicle of the type having an engine with an auxiliary shaft, an engine oil reservoir and an engine oil pump driven from said engine and receiving lubricant from said engine oil reservoir and also having a chassis distributing system with flow metering outlets feeding the chassis bearings; the combination therewith of a valving and metering unit for said chassis system including a distributing receiver chamber, an inlet to said chamber from the engine oil pump, an outlet to the chassis system from said chamber, valve means for opening said inlet to said chamber for a relatively short period of time and at the same time for closing said outlet, and also for opening said outlet for a relatively long period of time and at the same time closing said inlet, and means to actuate said valve means driven from said auxiliary shaft, said last mentioned means including a gearing train, a toothed clutch connection preventing movement in one direction and permitting movement in the other direction, and manual means to advance said clutch connection in said other direction.

17. In an automotive vehicle of the type having an engine with an auxiliary shaft, an engine oil reservoir and an engine oil pump driven from said engine and receiving lubricant from said engine oil reservoir and also having a chassis distributing system with flow metering outlets feeding the chassis bearings; the combination therewith of a valving and metering unit for said chassis system including a distributing receiver chamber, an inlet to said chamber from the engine oil pump, an outlet to the chassis system from said chamber, valve means for opening said inlet to said chamber for a relatively short period of time and at the same time for closing said outlet, and also for opening said outlet for a relatively long period of time and at the same time closing said inlet, and means to actuate said valve means driven from said auxiliary shaft, said actuating means serving to actuate said valve means at spaced intervals, and manual means to advance said last mentioned means.

18. In a mechanism of the type having an auxiliary shaft, an oil reservoir and an oil pump and receiving lubricant from said oil reservoir and also having a distributing system with flow metering outlets feeding bearings; the combination therewith of a valving and metering unit for said system including a distributing receiver chamber, an inlet to said chamber from the oil pump, an outlet to the system from said chamber, valve means for opening said inlet to said chamber for a relatively short period of time and at the same time for closing said outlet, and also for opening said outlet for a relatively long period of time and at the same time closing said inlet, and means to actuate said valve means driven from said auxiliary shaft, including a train of clock gear units, each consisting of a large driven gear wheel and a small rigidly connected driving pinion, said gears being mounted loosely on adjacent parallel shafts with the driving pinions of one clock gear unit meshing with the gear wheel of the next gear unit, whereby a compact gear assemblage is obtained capable of high reduction, said unit having a compartment receiving said gear assemblage and a structure at one side of said compartment receiving said chamber and a detachable screw cap for said chamber.

19. A lubricating system comprising drip plugs at various bearings, a distributing main having branches delivering to said drip plugs, an oil pump, a unit for feeding oil from said pump to said main, said unit including a resilient oil chamber, a valve normally closing the resilient chamber from the oil pump, said chamber normally having open communication to said main, and power driven means for periodically operating said valve to close off the resilient chamber from the main and at the same time open the connection from the oil pump to the chamber during a relatively short interval, including a train of clock gear units each consisting of a large driven gear wheel and a small rigidly connected driving pinion, said gears being mounted loosely on adjacent parallel shafts with the driving pinions of one clock gear unit meshing with the gear wheel of the next gear unit, whereby a compact gear assemblage is obtained capable of high reduction, said unit having a compartment receiving said gear assemblage and a structure at one side of said compartment receiving said chamber and a detachable screw cap for said chamber.

EDWARD H. KOCHER.